US010935947B2

United States Patent
Lee et al.

(10) Patent No.: US 10,935,947 B2
(45) Date of Patent: Mar. 2, 2021

(54) METHOD FOR SETTING SLAVE IDENTIFICATION INFORMATION FOR ACTUATOR MOVEMENT SENSING ELEMENT

(71) Applicant: Dongwoon Anatech Co., Ltd., Seoul (KR)

(72) Inventors: Ho Seok Lee, Seoul (KR); Jung Ho Jin, Seoul (KR)

(73) Assignee: Dongwoon Anatech Co., Ltd., Seoul (KR)

( * ) Notice: Subject to any disclaimer, the term of this patent is extended or adjusted under 35 U.S.C. 154(b) by 0 days.

(21) Appl. No.: 16/615,994

(22) PCT Filed: May 15, 2018

(86) PCT No.: PCT/KR2018/005529
§ 371 (c)(1),
(2) Date: Nov. 22, 2019

(87) PCT Pub. No.: WO2018/216942
PCT Pub. Date: Nov. 29, 2018

(65) Prior Publication Data
US 2020/0081407 A1 Mar. 12, 2020

(30) Foreign Application Priority Data
May 26, 2017 (KR) .......... 10-2017-0065248

(51) Int. Cl.
G05B 19/042 (2006.01)
H04N 5/232 (2006.01)

(52) U.S. Cl.
CPC .......... *G05B 19/042* (2013.01); *H04N 5/2328* (2013.01); *H04N 5/23258* (2013.01); *G05B 2219/2231* (2013.01)

(58) Field of Classification Search
CPC .......... G05B 19/042; G05B 2219/2231; H04N 5/23258; H04N 5/2328
See application file for complete search history.

(56) References Cited

U.S. PATENT DOCUMENTS

2008/0310039 A1* 12/2008 Tanaka ............... H04N 5/23206
359/823
2013/0238278 A1* 9/2013 Shoemaker ............ G01D 5/145
702/145

FOREIGN PATENT DOCUMENTS

JP H07-261224 A 10/1995
JP 2010-191210 A 9/2010
(Continued)

OTHER PUBLICATIONS

International Search Report PCT/ISA/210 for International Application No. PCT/KR2018/005529 dated Sep. 5, 2018.

*Primary Examiner* — Nicholas G Giles
(74) *Attorney, Agent, or Firm* — Harness, Dickey & Pierce, P.L.C.

(57) ABSTRACT

The present invention relates to a method for setting slave identification information for an actuator movement sensing element and, more particularly, to a method for sensing a distance, by which an actuator having a lens assembly coupled thereto has moved in one direction among an x-axis, a y-axis, and a z-axis, and transmitting the sensed distance to a master controller according to a two-wire interface scheme. The method comprises the steps of: when a slave identification information change command is received from a master controller, checking whether actuator movement distance sensing data is input from a hall sensor allocated to itself; and as a result of the checking, when actuator movement distance sensing data equal to or greater than a set value is input, setting slave identification information assigned at the time of production to be changed into slave (Continued)

identification information transmitted by the master controller.

5 Claims, 5 Drawing Sheets

(56) References Cited

FOREIGN PATENT DOCUMENTS

| KR | 10-2011-0085141 A | 7/2011 |
| KR | 10-2014-0036696 A | 3/2014 |
| KR | 10-2014-0140572 A | 12/2014 |
| KR | 10-2016-0095911 A | 8/2016 |
| KR | 10-2017-0054608 A | 5/2017 |

* cited by examiner

METHOD FOR SETTING SLAVE IDENTIFICATION INFORMATION FOR ACTUATOR MOVEMENT SENSING ELEMENT

CROSS-REFERENCE TO RELATED APPLICATIONS

This application is a national phase under 35 U.S.C. § 371 of PCT International Application No. PCT/KR2018/005529 which has an International filing date of May 15, 2018, which claims priority to Korean Patent Application No. 10-2017-0065248, filed May 26, 2017, the entire contents of each of which are hereby incorporated by reference.

TECHNICAL FIELD

This invention relates to an actuator movement sensing element of a camera, and more particularly, to a method of assigning and setting slave identification information, which is necessary for performing data communication with a plurality of actuator movement sensing elements, to each actuator movement sensing element.

BACKGROUND ART

In portable communication devices equipped with camera modules, as mobility and portability increase, there occurs a phenomenon in which images are disturbed due to minute vibrations or shaking generated by a human body. As measures for obtaining clear images, camera modules equipped with shake correction devices (or technologies) have become common. The shake correction devices (technologies) are classified into digital image stabilization (DIS) methods, electronic image stabilization (EIS) methods, and optical image stabilization (OIS) methods. In terms of performance, the OIS methods are widely used.

In a shake correction device using an OIS method, a passive Hall sensor is basically used to receive feedback of a movement distance of an actuator (or a carrier in a narrow sense). That is, it can be regarded that Hall sensors on X and Y axes and an analog front end (AFE) and a shake corrector (an OIS controller), which are configured to pre-process signals output from the Hall sensors, constitute the shake correction device. The AFE and the shake corrector (the OIS controller) are included in a single integrated circuit (IC) chip (which is also referred to as an OIS controller IC). As described above, as shown in FIG. 1, when the AFE and the shake corrector (the OIS controller) are included in a single IC chip, in order to connect Hall sensors 10 and 20 to an OIS controller IC 30, seven pins for VHX, XH+, XH−, VHY, YH+, YH−, and a common GND are required. As shown in FIG. 2, in order to drive an actuator of a camera module, four driver connection pins P1 to P4 are required so that a total of eleven pins and lines for connecting the eleven pins should be formed in a flexible circuit board (FPCB). For reference, in FIG. 2, A and B represent the Hall sensors on the X and Y axes, respectively.

When axes for controlling a camera module increases, the number of the Hall sensors increases accordingly, and the number of pins for connecting the increased number of the Hall sensors to a peripheral circuit also increases. Minimizing output pins of the Hall sensors required to control the camera module and driver connection pins for driving an actuator of the camera module may contribute to not only providing convenience in designing and manufacturing a FPCB which connects the camera module to the OIS controller IC but also reduce a manufacturing cost. Therefore, a new method is urgently needed to minimize the number of physical pins for connecting the camera module to the OIS controller IC.

Meanwhile, shake correction performance and auto-focusing performance are affected by a temperature inside the camera module. A gain, i.e., sensitivity of a Hall sensor, which senses a movement distance of the actuator in x- and y-axis directions perpendicular to an optical axis (a z-axis) direction of the actuator to which a lens assembly is coupled, is varied according to a temperature variation so that a magnitude of an output voltage of the Hall sensor is also varied. Further, a magnet is used to detect the movement distance of the actuator using the Hall sensor. As the temperature inside the camera module varies, performance of the magnet is also varied. Consequently, a system loop gain is varied such that OIS performance is degraded. In addition, in the case of the optical axis of the actuator, a lens is affected due to the temperature variation such that a problem occurs in that auto focusing is not performed normally.

A two-wire interface (I2C) method may be employed as a measure for overcoming the above limitations as well as minimizing the number of physical pins connecting the camera module to the OIS controller IC. In order to transmit an axial movement distance of the actuator between the camera module corresponding to a slave and the OIS controller IC corresponding to a master using the two-wire interface scheme, identification information (address) for identifying each axial movement distance is required.

In order to satisfy such a requirement, different identification information should be assigned to each actuator movement sensing element for sensing an axial movement distance of a camera actuator. That is, an actuator movement sensing element producer should produce actuator movement sensing elements by giving different slave identification information thereto, and a purchaser of the actuator movement sensing elements should discriminate and manage the actuator movement sensing elements having the different slave identification information. In this case, since a separate process and separate management are needed to assign different slave identification information from the perspective of the producer, an decrease in productivity and an increase in management costs are caused and an inefficiency problem occurs in that the purchaser also needs to carefully manage and operate component elements having different identification information.

RELATED ART DOCUMENT

Patent Document (Patent Document 1) Korean Patent Laid-Open Publication No. 10-2014-0036696
(Patent Document 2) Korean Patent Laid-Open Publication No. 10-2016-0095911

SUMMARY OF INVENTION

Technical Problem

The present invention is directed to providing a method of setting slave identification information for an actuator movement sensing element, which is capable of improving productivity and facilitating management of an actuator movement sensing element which is capable of transmitting data according to a two-wire interface scheme, and to providing a method of setting slave identification information which is executable on a master controller and an actuator movement sensing element which are capable of performing data communication using the two-wire interface scheme.

The present invention is also directed to providing a method of setting slave identification information for an actuator movement sensing element, which is capable of providing convenience in management of an actuator movement sensing element to a producer which purchases an actuator movement sensing element used in a camera module to assemble or produce the camera module and reducing management costs and risk management for the producer, and to providing a method of setting slave identification information which is executable on a master controller and an actuator movement sensing element.

Solution to Problem

One aspect of the present invention provides a method of setting slave identification information for an actuator movement sensing element, which senses a movement distance of an actuator, to which a lens assembly is coupled, in one direction among x-axis, y-axis, and z-axis directions to transmit the movement distance to a master controller in a two-wire interface scheme, the method including, when a slave identification information change command is received from the master controller, checking whether actuator movement distance sensing data is input from a Hall sensor assigned to the actuator movement sensing element, and, when the actuator movement distance sensing data, which is greater than or equal to a set value, is input as the checking result, changing and setting slave identification information assigned during production as slave identification information transmitted from the master controller.

The slave identification information transmitted from the master controller may be received following the slave identification information change command.

Another aspect of the present invention provides a method of setting slave identification information for an actuator movement sensing element, which is executable on a master controller for transmitting and receiving data to and from a plurality of actuator movement sensing elements, each having a Hall sensor for sensing a movement distance of an actuator in an optical axis (z-axis) or any one direction of x-axis and y-axis directions perpendicular to the optical axis (z-axis) of the actuator to which a lens assembly is coupled in a two-wire interface scheme, the method including a first operation of transmitting a communication initiation signal to the plurality of actuator movement sensing elements and then transmitting slave identification information change command and slave identification information which will be changed, a second operation of outputting a command for moving the actuator in an optical axis direction or any one axial direction of the x-axis and y-axis directions perpendicular to the optical axis to an actuator driving unit, and a third operation of setting an actuator movement sensing element, which sets the transmitted slave identification information to its own slave identification information, as the actuator movement sensing element in an axial direction, which moves the actuator.

The method may further include repeating the first to third operations in the x-axis and y-axis directions or in the x-axis, y-axis, and z-axis directions.

Advantageous Effects of Invention

In accordance with the present invention, since the master controller can set slave identification information for a plurality of actuator movement sensing elements which are capable of performing data communication in a two-wire interface scheme, even when a producer produces the plurality of actuator movement sensing elements by assigning the same identification information thereto, a purchaser of the plurality of actuator movement sensing elements can conveniently assign new identification information as necessary.

Therefore, in accordance with the present invention, convenience of parts managements can be provided to the purchaser who purchases the actuator movement sensing elements to assemble or produce a camera module and, simultaneously, an effect which is capable of reducing management costs and risk management for the purchaser can be provided. Further, an effect of improving productivity can be provided to the producer producing the actuator movement sensing elements as well as providing convenience of management to the producer.

DETAILED DESCRIPTION OF EMBODIMENT

Hereinafter, exemplary embodiments of the present invention will be described in detail with reference to the accompanying drawings. In the following description of the present invention, when related known functions or configurations are determined to obscure the gist of the present invention, a detailed description thereof will be omitted herein.

Figure 1:
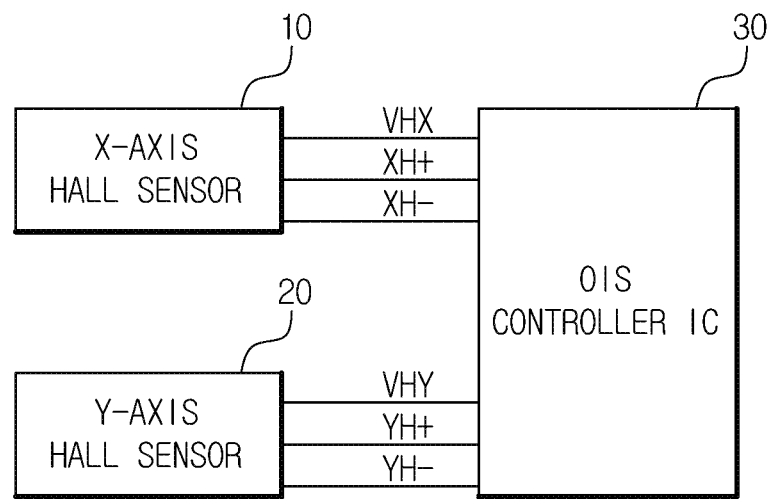
FIG. 1 is a schematic block diagram illustrating a general shake correction device.
Figure 2:
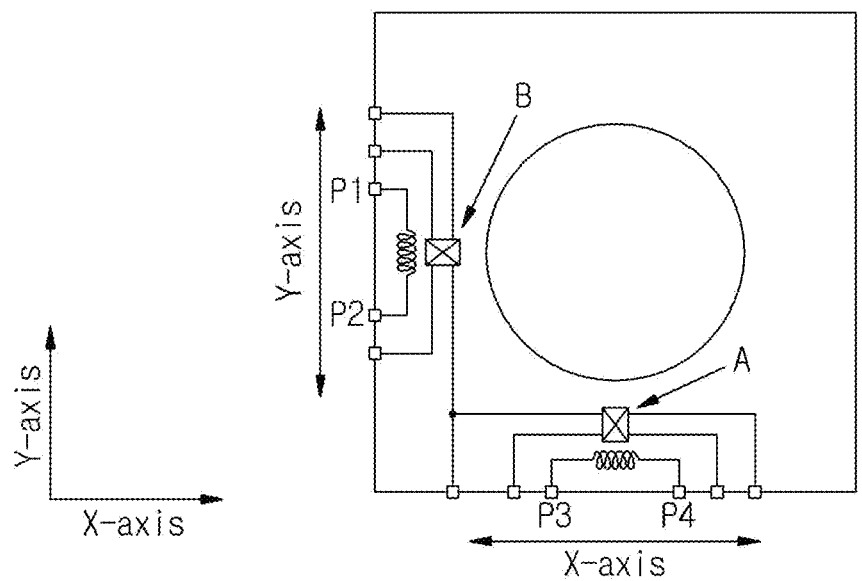
FIG. 2 is an exemplary diagram illustrating a circuit connection of a general camera module.
Figure 3:
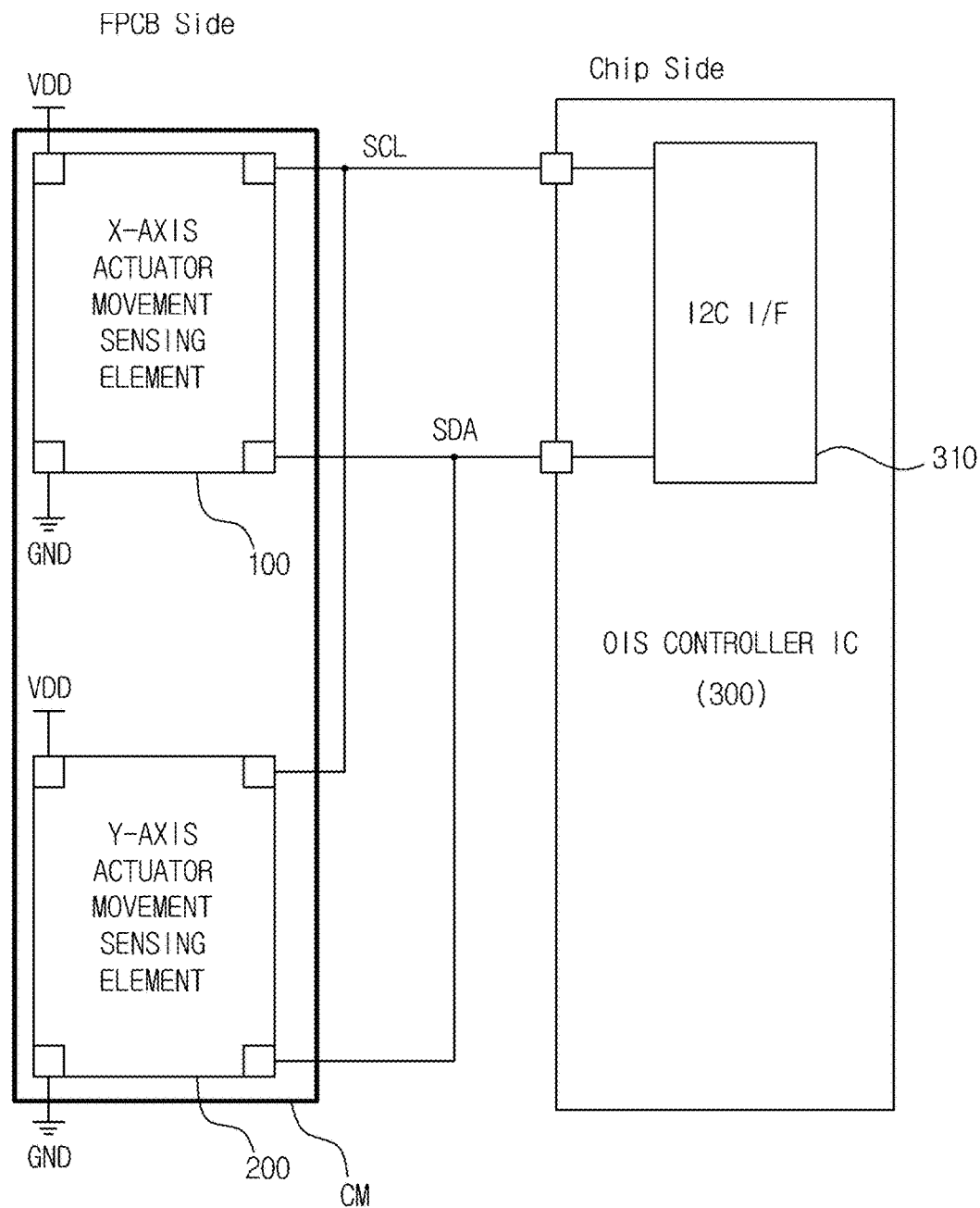
FIG. 3 is an exemplary diagram illustrating a connection state between actuator movement sensing elements constituting a camera module CM and an optical image stabilization (OIS) controller integrated circuit (IC) 300 corresponding to a master controller according to an embodiment of the present invention.

FIG. 3 is an exemplary diagram illustrating a connection state between actuator movement sensing elements 100 and 200 constituting a camera module CM and an optical image stabilization (OIS) controller integrated circuit (IC) 300 corresponding to a master controller according to an embodiment of the present invention.

First, the camera module CM according to the embodiment of the present invention includes an actuator to which a lens assembly is coupled and actuator driving coils MX and MY for driving the actuator and further includes a plurality of actuator movement sensing elements 100 and 200 for detecting movement distances of the actuator in x-axis and y-axis directions perpendicular to an optical axis (z-axis) direction of the actuator to which the lens assembly is coupled and for transmitting the detected movement distances to the OIS controller IC 300 corresponding to the master controller in a two-wire interface (SCL and SDA) method. Alternatively, according to embodiments, the camera module CM may further include an actuator movement sensing element (not shown) in the z-axis direction for detecting a movement distance of the actuator moved in the optical axis direction of the actuator.

The OIS controller IC 300 corresponding to the master controller corrects hand shaking by receiving feedback of movement distances of the actuator moving in one axial direction from the plurality of actuator movement sensing elements 100 and 200 in the two-wire interface scheme.

Further, in a slave identification information setting mode according to the embodiment of the present invention, the OIS controller IC 300 may change slave identification information for each of the actuator movement sensing elements 100 and 200. In the slave identification information setting mode, the OIS controller IC 300 may issue a command for moving the actuator in an x-axis, y-axis, or, in some cases, z-axis direction.

For reference, the term "slave" used in the embodiment of the present invention is a relative term for a "master," and each of the actuator movement sensing elements 100 and 200 is defined as corresponding to a slave. Further, the "slave identification information setting mode" indicates a mode for changing and setting slave identification information assigned to each of the actuator movement sensing elements 100 and 200 during production. It is assumed that each of the actuator movement sensing elements 100 and 200 are given the same slave identification information during a production process.

Referring to FIG. 3, a serial data pin SDA and a serial clock pin SCL of each of the plurality of actuator movement sensing elements 100 and 200 may be shared and connected to a serial data pin and a serial clock pin of the OIS controller IC 300, and a power pin VDD and a ground pin GND of each of the actuator movement sensing elements 100 and 200 may be shared or only one of the power pin VDD and the ground pin GND may be shared.

As described above, when the plurality of actuator movement sensing elements 100 and 200 constituting the camera module and the OIS controller IC 300 transmit and receive data through the two-wire interface scheme, the number of physical pins and the number of lines connecting the camera module CM to the OIS controller IC 300 are minimized so that advantages of convenience in designing and manufacturing a flexible printed circuit board (FPCB) may be obtained.

Figure 4:
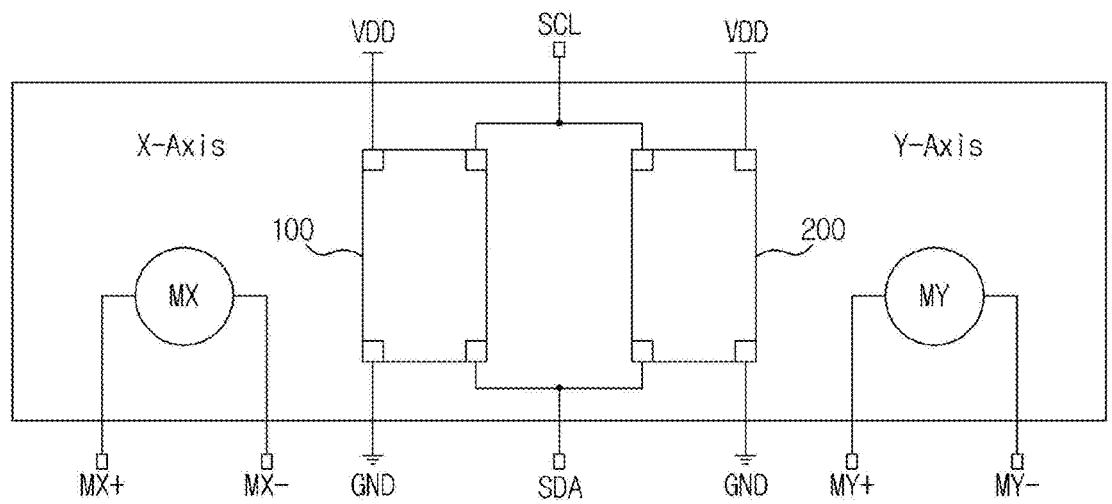
FIG. 4 is an exemplary diagram illustrating a pin connection state of the camera module CM including a plurality of actuator movement sensing elements 100 and 200 and actuator driving coils MX and MY.

For reference, FIG. 4 illustrates a pin connection state of the camera module CM including the plurality of actuator movement sensing elements 100 and 200 and the actuator driving coils MX and MY.

Referring to FIG. 4, the actuator movement sensing elements 100 and 200 for sensing movement distances of the actuator in the x-axis and y-axis directions and the actuator driving coils MX and MY are included in the camera module to which the actuator movement sensing elements 100 and 200 for a camera module according to the embodiment of the present invention are applied.

Thus, a total of eight pins, which include four pins MX+, MX−, MY+, and MY− required to drive the actuator driving coils MX and MY, two two-wire interface pins SCL and SDA for data interfacing with the OIS controller IC 300, one common power supply pin VDD, and one common ground pin GND, are required. When compared to the number of pins connecting the conventional camera module to the OIS controller IC, three pins may be omitted such that the number of pins may be reduced when the camera module is manufactured. Consequently, convenience in designing and manufacturing the FPCB may be provided.

Hereinafter, the actuator movement sensing elements 100 and 200 for a camera module, which are accommodated in the camera module, will be further described with reference to FIG. 5.

Figure 5:
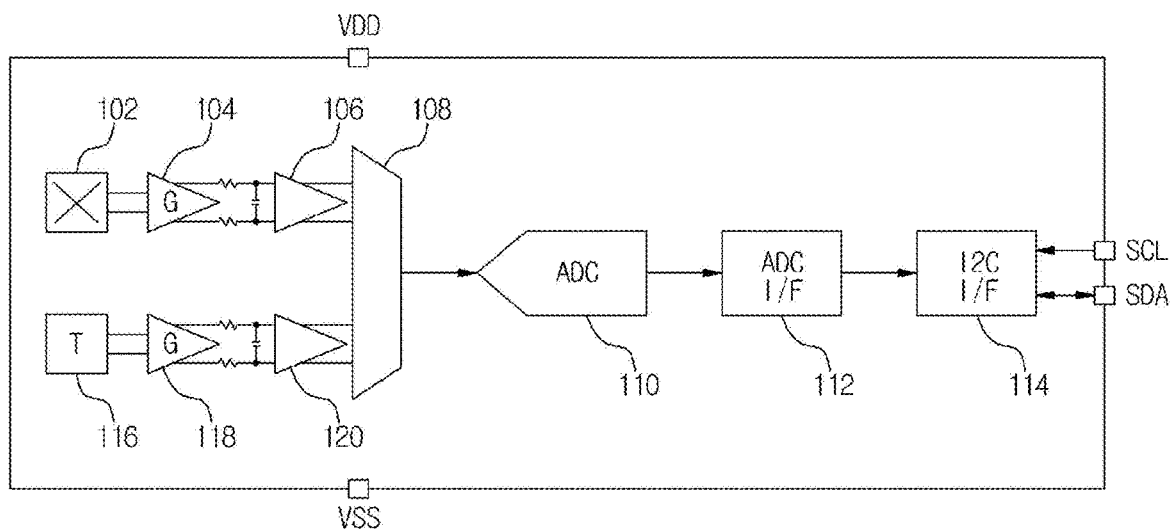
FIG. 5 is a schematic block diagram illustrating the actuator movement sensing element shown in FIG. 3.

As shown in FIG. 5, each of the actuator movement sensing elements 100 and 200 for a camera module according to the embodiment of the present invention, which is implementable with a digital sensor, includes a Hall sensor 102 for sensing a movement distance of the actuator in the x-axis or y-axis direction perpendicular to the optical axis (z-axis) direction of the actuator to which the lens assembly is coupled, a first signal preprocessor for amplifying (in an amplifier 104) an actuator movement distance sensing signal output from the Hall sensor 102, removing noise (in an RC filter) from the actuator movement distance sensing signal, and converting the actuator movement distance sensing signal into actuator movement distance sensing data in a digital form (in an analog-to-digital converter (ADC) and an ADC interface (I/F)), and an interface (I2C I/F) 114 for transmitting the actuator movement distance sensing data to the OIS controller IC 300 in a two-wire interface scheme.

The interface 114 in each of the actuator movement sensing elements 100 and 200 includes a storage for storing the slave identification information assigned during the production process and a controller for changing the stored slave identification information to slave identification information which is requested to be changed by the master controller. For reference, the Hall sensor 102, the first signal preprocessor, and the interface 114 may be packaged in a digital one-chip IC.

Further, in order to sense a temperature of the actuator in the camera module, each of the actuator movement sensing elements 100 and 200 for a camera module, which has the above-described configuration, may further include a temperature sensing sensor 116 for sensing an ambient temperature of the actuator, a second signal preprocessor for amplifying (in an amplifier 118) a temperature sensing signal output from the temperature sensing sensor 116 and removing noise (in an RC filter) from the temperature sensing signal, a multiplexer 108 for selectively outputting one of the actuator movement distance sensing signal from which noise is removed and the temperature sensing signal from which noise is removed to a digital conversion part (the ADC) of the first signal preprocessor according to a control period.

In this case, the Hall sensor 102, the first signal preprocessor (including the amplifier 104, the RC filter, and a driver 106), the interface 114, the temperature sensing sensor 116, the second signal preprocessor (including the amplifier 118, the RC filter, and a driver 120), the multiplexer 108, and digital conversion parts 110 and 112 may be packaged in a digital one-chip IC.

Hereinafter, operations of the above-described actuator movement sensing elements 100 and 200 will be described in detail.

First, when the actuator to which the lens assembly is coupled moves in the x-axis and/or y-axis direction perpendicular to the optical axis (z-axis), each of the Hall sensors 102 sense a movement distance of the actuator in the x- or y-axis direction and output the movement distance. Then, the actuator movement distance sensing signal is amplified by the amplifier 104, noise is removed from the actuator movement distance sensing signal in the RC filter, and the actuator movement distance sensing signal bypasses through the driver 106 and is applied to the multiplexer 108.

Meanwhile, when the temperature sensing sensor 116 is provided in the camera module, when the temperature sensing sensor 116 detects and outputs an ambient temperature of the actuator, and when a temperature sensing signal is also amplified by the amplifier 118, noise is removed from the temperature sensing signal by the RC filter, and then the temperature sensing signal bypasses through the driver 120 to be applied to the multiplexer 108.

Accordingly, the actuator movement distance sensing signal and the temperature sensing signal of different channels applied to the multiplexer 108 are transmitted to the interface 114, which transmits data in the two-wire interface scheme, according to a control period through the ADC 110 and the ADC I/F 112 which are the digital conversion parts.

Thus, the interface 114 transmits digitally converted actuator movement distance sensing data or digitally converted temperature sensing data to the OIS controller IC 300 as serial data according to a serial clock SCL.

However, in order to allow data to be normally transmitted and received between the actuator movement sensing elements 100 and 200 and the OIS controller IC 300 corresponding to the master controller, the actuator movement sensing elements 100 and 200 corresponding to the slaves should be identified therebetween. Since the same slave identification information is assigned to the actuator movement sensing elements 100 and 200 according to the embodiment of the present invention during production, a company which purchases and assembles the actuator movement sensing elements 100 and 200 to produce a set should change the slave identification information for each of the actuator movement sensing elements 100 and 200 through the following method.

Figure 6:
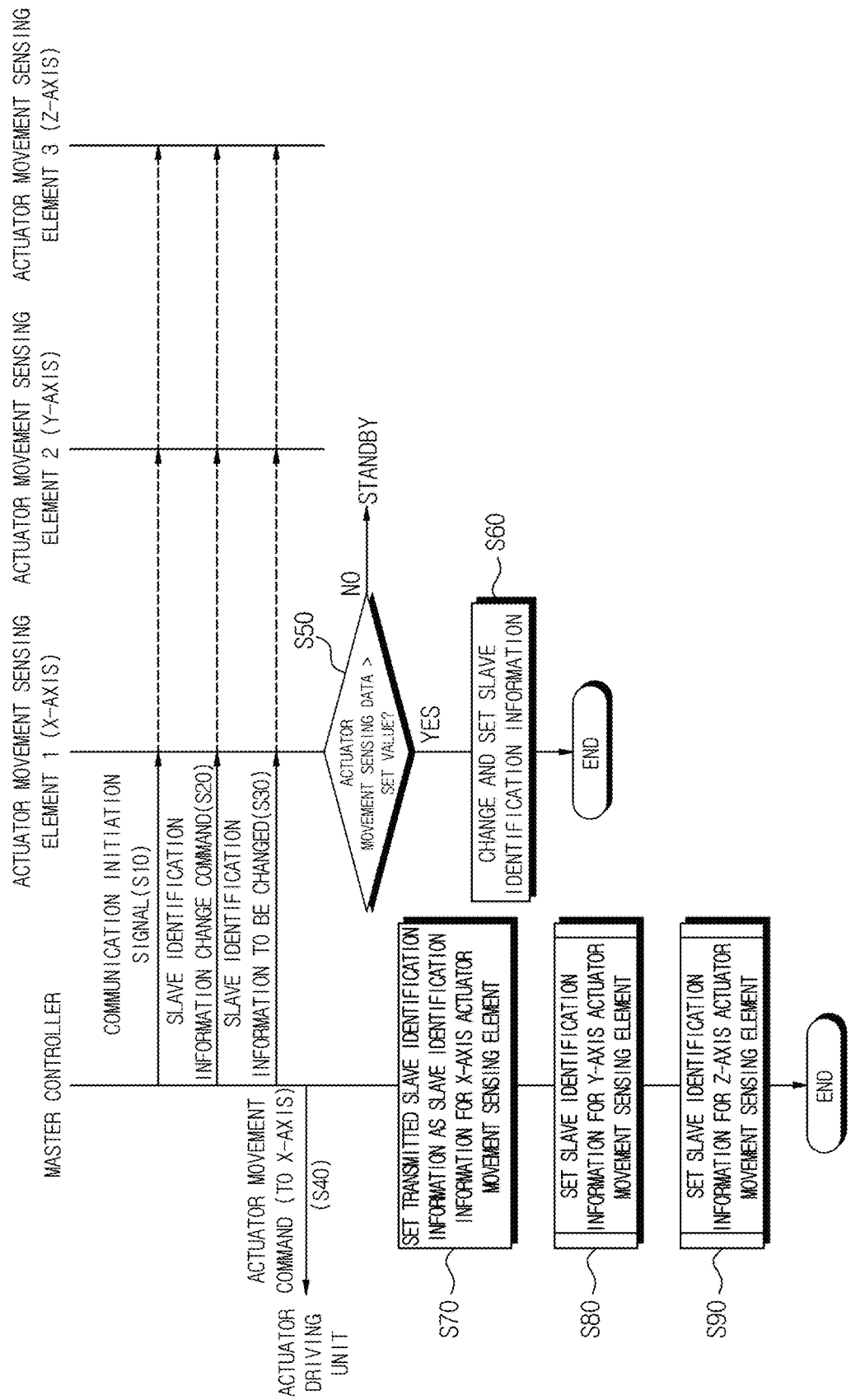
FIG. 6 is an exemplary flowchart illustrating setting of slave identification information for the actuator movement sensing element according to an embodiment of the present invention.
Figure 7:
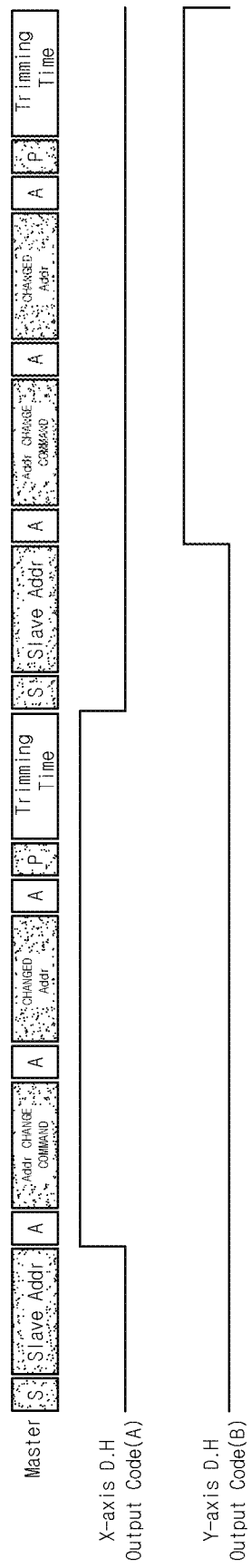
FIG. 7 is an exemplary diagram illustrating a flow of information transmitted and received between the master controller and the actuator movement sensing element according to an embodiment of the present invention.

FIG. 6 illustrates a flowchart for setting of slave identification information for the actuator movement sensing element according to an embodiment of the present invention, and FIG. 7 illustrates a flow of information transmitted and received between the OIS controller IC 300 corresponding to the master controller and the actuator movement sensing elements 100 and 200 according to an embodiment of the present invention.

As described above, changing and setting of the slave identification information according to the embodiment of the present invention is performed in the "slave identification information setting mode" due to intervention of an administrator. As shown in FIG. 7, in the slave identification information setting mode, in response to an administrator command, the OIS controller IC 300, which is a master controller, transmits a communication initiation signal S (start) to the actuator movement sensing elements 100 and 200 according to the two-wire interface scheme (operation S10). Since the serial data pin and the serial clock pin of each of the plurality of actuator movement sensing elements 100 and 200 are shared and connected to the serial data pin and the serial clock pin of the OIS controller IC 300, the communication initiation signal is transmitted to the plurality of actuator movement sensing elements 100 and 200.

As shown in FIG. 7, next to the communication initiation signal S, the OIS controller IC 300 serving as the master controller transmits the same slave identification information Slave Addr to the actuator movement sensing elements 100 and 200, and, when an acknowledgment signal A is received from the actuator movement sensing elements 100 and 200, the OIS controller IC 300 transmits slave identification information Addr change command to the actuator movement sensing elements 100 and 200 (operation S20). The slave identification information Addr change command is also transmitted to the plurality of actuator movement sensing elements 100 and 200.

Then, as shown in FIG. 7, when the acknowledgment signal A is received from the actuator movement sensing elements 100 and 200, the OIS controller IC 300 which is the master controller transmits the slave identification information Addr, which will be changed, to the actuator movement sensing elements 100 and 200 and then outputs a command for moving the actuator in any one axial direction of the x-axis and the y-axis directions perpendicular to the optical axis direction (z-axis) to an actuator driving unit (operation S40). It is assumed that the command for moving the actuator is a command for moving the actuator from a home position to a full position.

In the following description, it is assumed that a command for moving the actuator in the x-axis direction is output to preferentially change and set slave identification information for the actuator movement sensing element 100 which senses a movement distance of the actuator moved in the x-axis direction, and then a command for moving the actuator in the y-axis direction is output to sequentially change and set slave identification information for the actuator movement sensing element 200 which senses a movement distance of the actuator moved in the y-axis direction.

Meanwhile, when the OIS controller IC 300 which is the master controller issues an actuator movement command for an x-axis full position, the actuator moves accordingly. The Hall sensor 102, which senses a movement distance of the actuator on the x-axis, senses and outputs the movement distance of the actuator moved in the x-axis direction. Then, the actuator movement distance sensing signal is amplified by the amplifier 104, noise is removed from the actuator movement distance sensing signal in the RC filter, and the actuator movement distance sensing signal bypasses through the driver 106 to be transmitted to the interface 114 through the multiplexer 108, the ADC 110, and the ADC I/F 112, wherein the ADC 110 and the ADC I/F 112 are the digital conversion parts.

Thus, the interface 114 checks whether digitally converted actuator movement distance sensing data (in the form of an output code) is input. When the actuator movement distance sensing data, which is greater than or equal to a set value, is input (operation S50), the OIS controller IC 300 which is the master controller changes and sets the slave identification information, which is assigned during production, to the slave identification information transmitted in operation S30 (operation S60).

Accordingly, the slave identification information transmitted from the OIS controller IC 300 which is the master controller may be newly set in the interface 114 of the x-axis actuator movement sensing element 100. For reference, when the actuator is moved from the home position to the full position, since the digitally converted actuator movement distance sensing data has a linearly increasing value, when the actuator movement distance sensing data, which is greater than or equal to the set value, is input, it is possible to recognize that the actuator is moved in a specific axial direction.

Meanwhile, when an actuator movement command in the x-axis direction is issued, the actuator movement is not sensed in the actuator movement sensing elements 200 located in the y-axis and the z-axis directions. Consequently, the actuator movement sensing elements 200 maintain the slave identification information assigned during production without responding to the slave identification information change command issued from the OIS controller IC 300 which is the master controller.

in FIG. 6, operation S70, which is not described, is an operation performed by the OIS controller IC 300 which is the master controller. The OIS controller IC 300 which is the master controller sets and stores the slave identification information transmitted in operation S30 as slave identification information for the x-axis actuator movement sensing element 100. Thus, the OIS controller IC 300 which is the master controller performs data communication with the plurality of actuator movement sensing elements 100 and 200 using the set and stored slave identification information for the actuator movement sensing element 100.

When the changing and setting of the slave identification information for the x-axis actuator movement sensing element 100 is completed with the above-described method above, the OIS controller IC 300 which is the master controller proceeds to operation S80 to set slave identification information for the y-axis actuator movement sensing element. The setting method repeats operations S10 to S70 and outputs a command for moving the actuator in the y-axis direction instead of the command for moving the actuator in the x-axis direction. Consequently, the slave identification information transmitted from the OIS controller IC 300 which is the master controller may be newly set in the interface of the y-axis actuator movement sensing element 200.

When the camera module is provided with a z-axis actuator movement sensing element, the process proceeds to operation S90 to set slave identification information for the z-axis actuator movement sensing element. The setting method also repeats operations S10 to S70 and outputs a command for moving the actuator in the z-axis direction. Consequently, the slave identification information transmitted from the OIS controller IC 300 which is the master controller may be newly set in an interface of a z-axis actuator movement sensing element.

According to the above-described embodiment, in the slave identification information setting mode, when the OIS controller IC 300 which is the master controller transmits the slave identification information change command to the plurality of actuator movement sensing elements 100 and 200 and then moves the actuator in one specific axial direction, each of the plurality of actuator movement sensing elements 100 and 200 responds only when the input actuator movement distance sensing data is greater than or equal to the set value to newly set the slave identification information as the slave identification information received from the OIS controller IC 300 which is the master controller. Consequently, even when the producer produces the actuator movement sensing elements by assigning the same identification information thereto, the purchaser of the actuator movement sensing elements may conveniently assign new identification information to the actuator movement sensing elements as necessary.

Therefore, the present invention provides convenience of parts management to the purchaser who purchases the actuator movement sensing elements to assemble or produce a camera module and, simultaneously, provides an effect capable of reducing management costs and risk management to the purchaser. Further, the present invention provides an effect of improving productivity to the producer producing the actuator movement sensing elements as well as providing convenience of management to the producer.

While the present invention has been described with reference to the embodiments shown in the drawings, these embodiments are merely illustrative and it should be understood that various modifications and equivalent other embodiments can be derived by those skilled in the art to which the present invention pertains. For example, in the embodiments of the present invention, the master controller has been described as the OIS controller, but a controller for comprehensively controlling the camera may operate as the master controller. Further, although the embodiments of the present invention have been described based on the assumption of one camera module, these embodiments of the present invention may be applied in the same manner to actuator movement sensing elements included in a dual camera. Therefore, the true technical scope of the present invention should be defined by the appended claims.

What is claimed is:

1. A method of setting slave identification information for an actuator movement sensing element, which senses a movement distance of an actuator, to which a lens assembly is coupled, in one direction among x-axis, y-axis, and z-axis directions to transmit the movement distance to a master controller in a two-wire interface scheme, the method comprising:
when a slave identification information change command is received from the master controller, checking whether actuator movement distance sensing data is input from a Hall sensor assigned to the actuator movement sensing element; and
when the actuator movement distance sensing data, which is greater than or equal to a set value, is input as the checking result, changing and setting slave identification information assigned during production as slave identification information transmitted from the master controller.

2. The method of claim 1, wherein the slave identification information transmitted from the master controller is received following the slave identification information change command.

3. The method of claim 1, wherein the actuator movement distance sensing data, which is greater than or equal to the set value, is data generated when the actuator is moved from a home position to a full position in any one axial direction among the x-axis, y-axis, and z-axis.

4. A method of setting slave identification information for an actuator movement sensing element, which is executable on a master controller for transmitting and receiving data to and from a plurality of actuator movement sensing elements, each having a Hall sensor for sensing a movement distance of an actuator in an optical axis (z-axis) or any one direction of x-axis and y-axis directions perpendicular to the optical axis (z-axis) of the actuator to which a lens assembly is coupled in a two-wire interface scheme, the method comprising:
transmitting a communication initiation signal to the plurality of actuator movement sensing elements and then transmitting slave identification information change command and slave identification information which will be changed;
outputting a command for moving the actuator in an optical axis direction or any one axial direction of the x-axis and y-axis directions perpendicular to the optical axis to an actuator driving unit; and
setting and storing the transmitted slave identification information as slave identification information for an actuator movement sensing element in an axial direction in which the actuator is moved.

5. The method of claim 4, comprising repeating the above operations in the x-axis and y-axis directions or in the x-axis, y-axis, and z-axis directions.

\* \* \* \* \*